Figure 1:
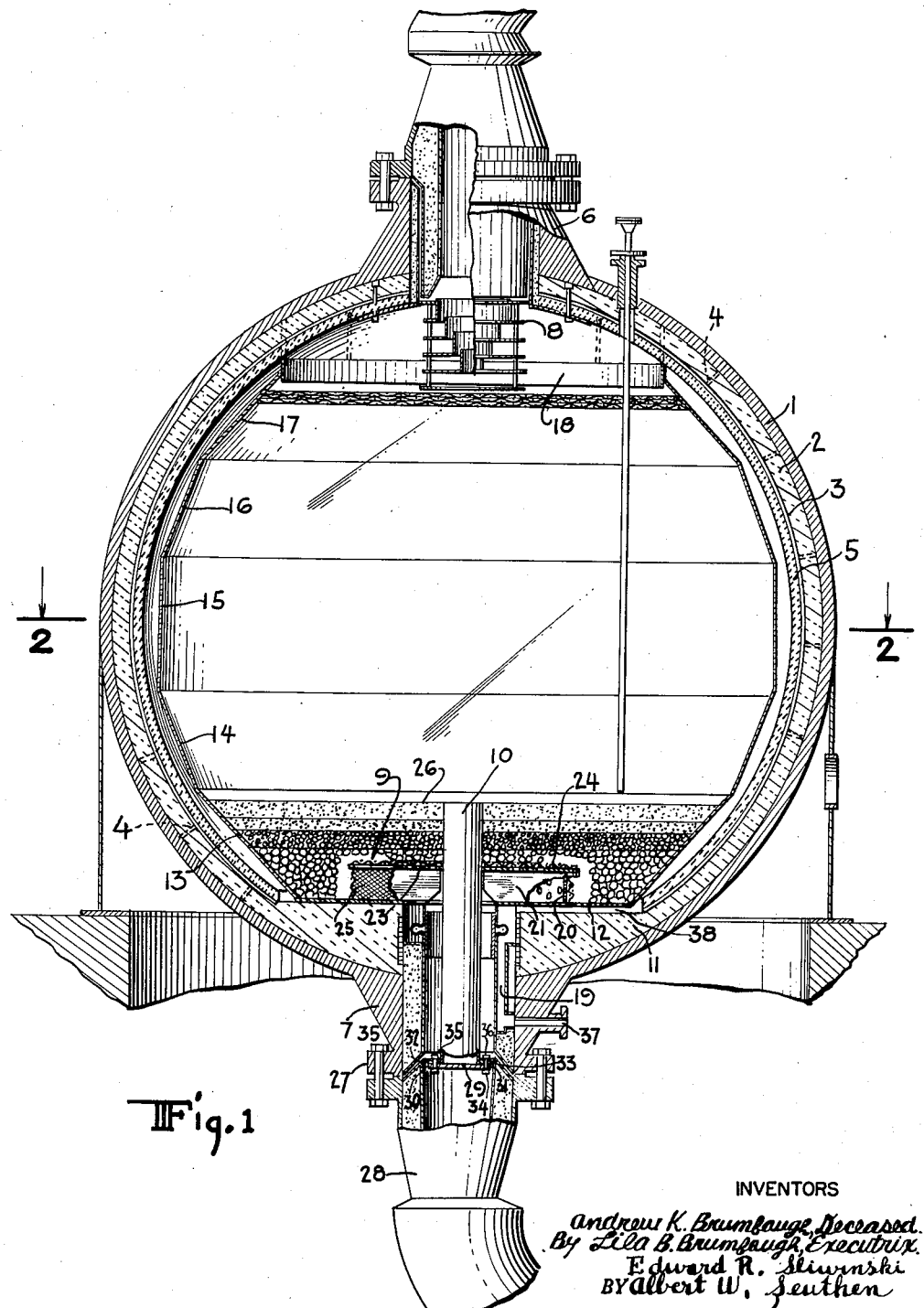

Nov. 14, 1961　　A. K. BRUMBAUGH ET AL　　3,008,811
BOTTOM-SUPPORTED LINER

Filed Sept. 18, 1958　　3 Sheets-Sheet 2

INVENTORS
Andrew K. Brumbaugh, Deceased
By Lila B. Brumbaugh, Executrix
Edward R. Sliwinski
BY Albert W. Seuthen Francis F. Johnston
AGENT

United States Patent Office 3,008,811
Patented Nov. 14, 1961

3,008,811
BOTTOM-SUPPORTED LINER
Andrew K. Brumbaugh, deceased, late of Florham Park, N.J., by Lyla B. Brumbaugh, executrix, Florham Park, N.J., and Edward R. Sliwinski, Bayside, and Albert W. Zeuthen, Wantagh, N.Y., assignors to Socony Mobil Oil Company, Inc., a corporation of New York
Filed Sept. 18, 1958, Ser. No. 761,780
6 Claims. (Cl. 23—289)

The present invention relates to reactors for hydrocarbon conversion at pressures in excess of atmospheric and, more particularly, to liners for said reactors supported in the region of the bottom of the reactor and having a substantially catalyst-tight sliding joint in the upper region of the reactor. Reactors for hydrocarbon conversion at superatmospheric pressures having liners supported by the roof of the reactor have been described. It has been found that such liners characterized as "top-supported" liners are not completely satisfactory for several reasons.

Top-supported liners suspended from hanger rings from the top of the reactor failed in some cases after relatively short periods of use at conversion temperatures of the order of 800° to 1000° F. In addition, "hot spots" develop on the shell in the region of contact of the hanger with the shell after failure of the hanger. These localized "hot spots" cause potential deterioration and embrittlement of the metal of the shell when the temperature thereof exceeds the order of 500° F. Furthermore, there is a tendency for reaction gases to by-pass the catalyst bed and flow between the reactor shell and insulation and between the reactor insulation and the liner when there is a failure of the top-supported liner hanger.

The present invention provides a bottom-supported liner for reactors for hydrocarbon conversion at superatmospheric pressure which permits better temperature control of the reactor shell, particularly at the bottom of the reactor, and prevents gas by-pass through the internal insulation. The bottom-supported liner described herein provides a structure in which the tendency is for any reaction gases in the space between the liner and the insulation to leak inwardly into the catalyst bed rather than from the bed into the space between the liner and the insulation. Accordingly, the present invention has as an object provision of a reactor for hydrocarbon conversion at superatmospheric pressures having a bottom-supported liner extending downwardly within the reactor along the side walls and across the bottom of the reactor and sealing off within the bottom the vapor outlet nozzle. The present invention also provides means for introducing purge gas behind the liner to remove hydrocarbon gases prior to catalyst regeneration and subsequent to coming off-stream, and to remove oxygen-containing gases prior to going on-stream and subsequent to catalyst regeneration.

Figure 2:
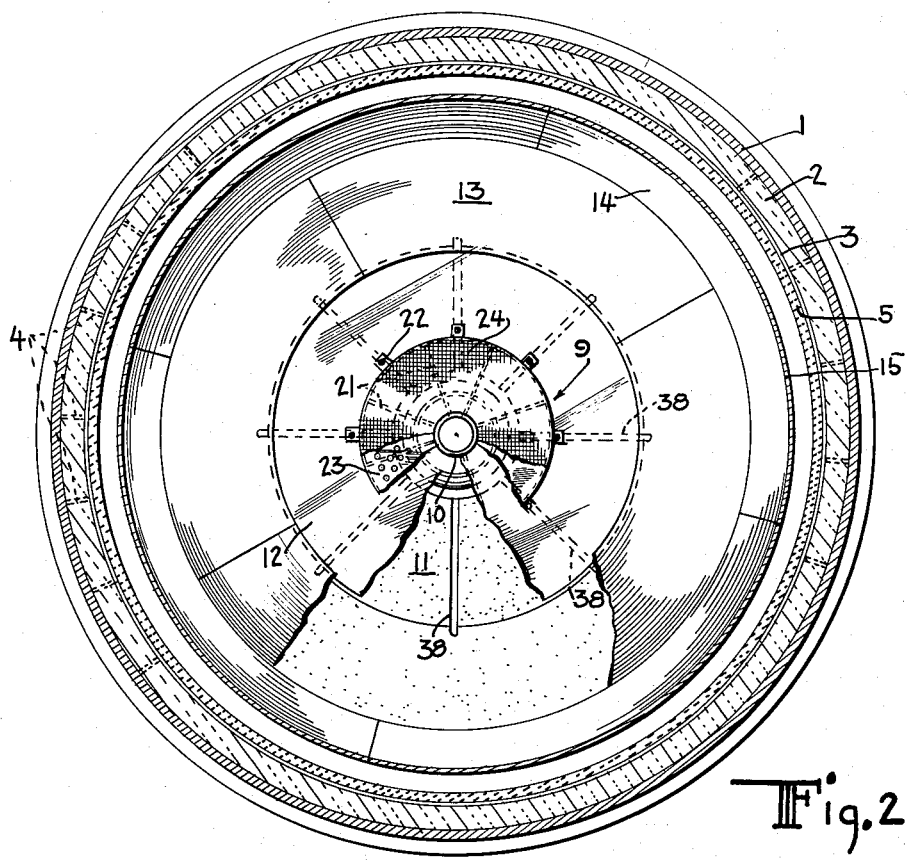
Figure 3:
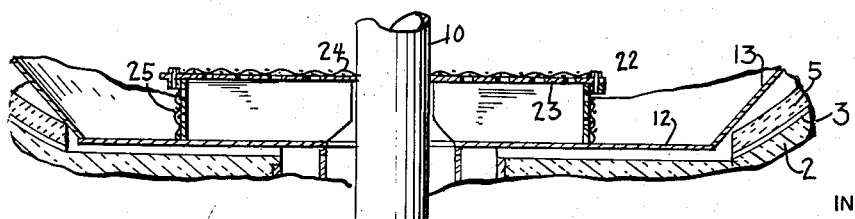

As disclosed in the co-pending application Serial No. 588,135, filed May 29, 1956, now U.S. Patent 2,884,372, a spherical reactor is preferred for hydrocarbon conversions taking place at pressures of 500 p.s.i.g. or more and temperatures of the order of 800° F. or more. Accordingly, the present invention in one embodiment will be illustrated by reference to a spherical reactor and a bottom-supported liner therefor for use in hydrocarbon conversion as illustrated in the accompanying drawings of which FIGURE 1 is a vertical section of a spherical reactor having a bottom-supported liner supported by a layer of insulating material of structural strength having grooves or canals in the upper surface thereof constructed and arranged to admit purge gas behind the liner, said spherical reactor being provided with means to admit purge gas to the space between the shell insulation and the aforesaid bottom-supported liner and to the reaction zone within the aforesaid bottom-supported liner;

FIGURE 2 is a horizontal cross-section of said spherical reactor taken at line 2—2 of FIG. 1 with parts cut away for clarity showing the vapor-solids separator and the purge gas canals in the support for the bottom-supported liner; and FIGURE 3 is an enlarged view of a vertical cross-section of a vapor-solids separator, catalyst dump pipe and liner support shelf such as illustrated in FIGURE 1.

The spherical reactor illustrated in FIGURE 1 comprises a shell 1 of steel, a layer 2 of insulating material, e.g., insulating concrete, a layer of steel mesh 3 preferably heat-resistant. The steel mesh is welded or otherwise rigidly attached to heat-resistant studs 4 which in turn are rigidly mounted on shell 1. In the layer 3 is laid a shallow layer 5 (about 1 inch thick) of refractory material such as refractory cement installed so as to be flush with the surface of the steel mesh 3 nearer the liner. The insulating concrete and refractory concrete preferably are laid down by gunning. The spherical reactor is provided with a vapor inlet 6 and a vapor outlet 7 preferably substantially concentric with the vertical diameter of the reactor. The vapor inlet 6 is provided with a vapor distributor 8 constructed and arranged to introduce vapors into the reactor as a plurality of streams flowing substantially parallel to the top of the catalyst bed. (Distributor 8 is described in more detail in the co-pending application Serial No. 588,135, filed May 29, 1956, in the name of Eric V. Bergstrom, now U.S. Pat. No. 2,884,372, and Serial No. 725,916, filed April 2, 1958, in the name of Andrew K. Brumbaugh, deceased.) The spherical reactor is provided with a solids-vapor separator 9 and catalyst dump pipe 10 more fully described in the co-pending application Serial No. 588,135, filed May 29, 1956, in the name of Eric V. Bergstrom, now U.S. Pat. No. 2,884,372.

It will be observed that insulating material 2 extends down to the bottom of the reactor forming a thickened horizontal shelf or platform 11 on which a plate 12 is supported; other insulating material surrounds the vapor inlet conduit 6.

The reactor liner, preferably of stainless steel, preferably comprises a plurality of frusto-conical annular sections 13, 14, 16 and 17 and may include a cylindrical annular section 15.

The lower edge of frusto-conical annular section 13 is welded to plate 12 at or in the region of the outer periphery thereof. The lower edge of section 14 is welded to the upper edge of section 13 and sections 15, 16 and 17 are successively welded in a similar manner to provide a continuous substantially gas-tight liner. The welded joints of the liner are preferably butt-welded. The upper edge of frusto-conical annular section 17 bears against a ring or cylinder 18 to form a sliding joint therewith to compensate for the expansion of the liner. Cylinder 18, preferably of heat-resistant stainless steel, is rigidly mounted as by welding at a plurality of points to layer 3. It will be observed that as a consequence of this construction the entire weight of the liner is carried by plate 12 and supporting shelf 11. The reactor is readily purged before going onstream after initially filling the reactor with catalyst and after regeneration of the catalyst in situ. Since conduit 19 is also in fluid communication with the space between the liner and the refractory and insulating layers on the shell this space also is purged.

The vapor-solids separator comprises a perforated cylinder 20 (FIGURE 1), radial ribs 21 (FIGURE 2) mounted on inner wall of said perforated cylinder and extending from the top to the bottom of said perforated cylinder, a plurality of stubs 22 rigidly mounted at a plurality of points on the outer periphery of cylinder 20, an annular perforated plate 23 having bolt holes coinciding with studs 22 and secured in place in a suitable manner as by nuts. Perforated plate 23 is welded to pipe 10 (FIGURE 1). A wire screen or other foraminous plate 24 is movably mounted in any suitable manner on perforated annular plate 23. A wire screen or other foraminous cylinder 25 is mounted on the outer side of the first perforated cylinder 20. The screens 24 and 25 are designed to retain the smallest particles of catalyst or other solids which can become entrained in the effluent of the reactor zone.

Pipe or cylinder 10 is supported in a rigid manner as by welding to perforated plate 23. Cylinder 10 extends above plate 23 to the bottom 26 of the catalyst bed. The bed of catalyst is supported by a bed of inert material such as tabular alumina resting upon plate 12. Preferably the tabular alumina comprises particles of various size varying from that of crushed alumina passing through ¼ inch on 8 mesh 0.032 wire screen to particles of approximately 0.75 inch in diameter.

Cylinder 10 extends below plate 23 into the vapor outlet and to the plane of the outer surface of the flange 27 of vapor outlet 7.

Cylinder or catalyst drain pipe 10 is provided at the lower end thereof with suitable closure means which can be readily opened after the removal of outlet piping connection 28. Illustrative of such a suitable closure device is cover plate 29.

Cover plate 29 comprises a disk the diameter of which is greater than the inside diameter and at least equal to the outside diameter of pipe 10. Cover plate 29 is provided with two diametrically opposed ears 30 and 31. Each ear is provided with a bolthole.

At diametrically opposed points on the outer periphery thereof pipe 10 is provided with tabs or shoulders 32 and 33, or other means for movably mounting cover plate 29. For example, two annuli of suitable wall thickness can be welded to pipe 10 to function as tabs or shoulders.

The cover plate 29 is mounted as closure means for pipe 10 by inserting a bolt having threaded ends through each of tabs or shoulders 32 and 33 and securing the cover plate snugly in place against the end of pipe 10 by drawing up a nut 34 on each of bolts 35 and 36.

When catalyst is to be drained from the reactor outlet piping connection 28 is removed. The cover plate can be swiveled on one bolt by removing respectively one nut 34 and withdrawing the corresponding bolt or removed entirely by removing both nuts and withdrawing cover plate 29.

Both charging the reactor with the required amount of catalyst, cylinder 10 is filled with particles of inert material such as balls of tabular alumina, preferably about 0.75 inch in diameter. The reaction zone is then charged with the required amount of particle-form catalyst. The inert material in cylinder 10 prevents substantial loss of catalyst through drain pipe 10 during charging and operation. However, when it is necessary to remove the catalyst from the reactor, closure means 29 is manipulated as set forth hereinbefore, the inert material in drain pipe 10 flows therefrom, and the catalyst is discharged through the drain pipe and vapor outlet 7.

Before regenerating the catalyst, the reactor, including the space between the liner and the insulating material on the shell, as well as the reaction zone, is purged by introducing a purge gas into purge connection 37 to conduit 19 through which the purge gas flows to the canals 38 in the shelf 11 and to the space between the liner and the insulated shell. After regeneration, the reaction zone and the space between the liner and the insulated shell is purged in a similar manner.

Figure 4:
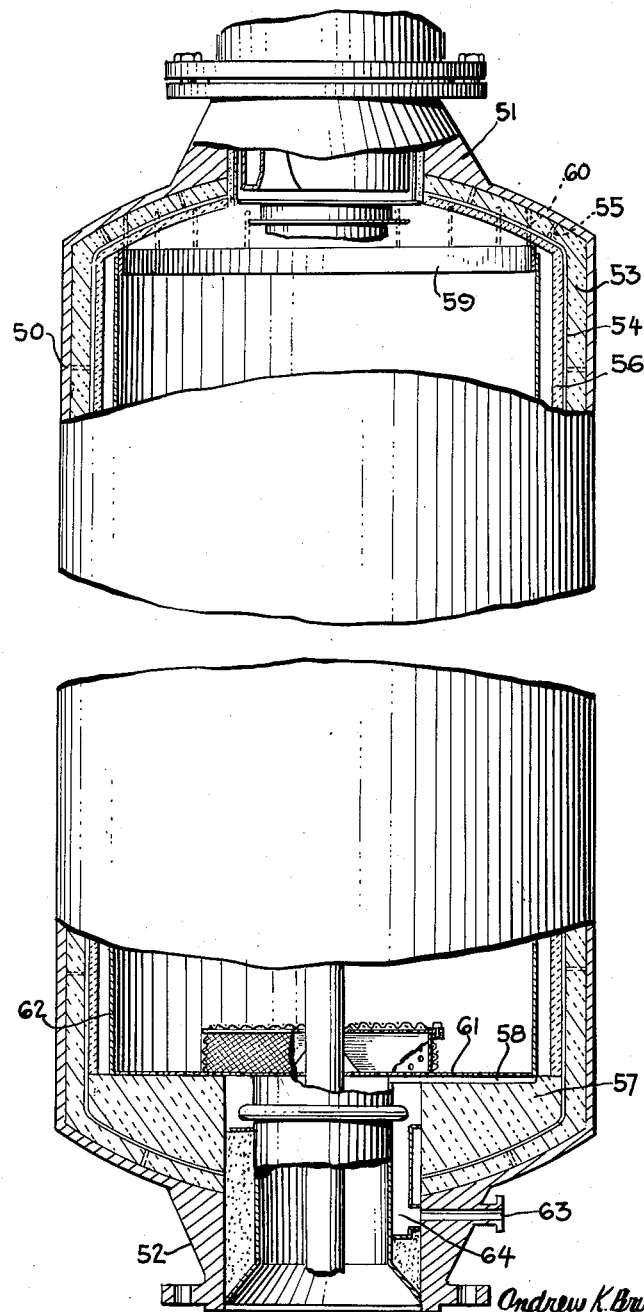

Similarly, a cylindrical, in contrast to a spherical, reactor likewise can be provided with a bottom-supported liner as illustrated in FIG. 4.

In FIGURE 4, a cylindrical reactor shell 50 having a vapor inlet 51 and a vapor outlet 52 substantially concentric with the vertical diameter of the cylindrical reactor is provided with an insulating layer of insulating material 53 and a metallic mesh 54 preferably heat resistant. Rigidly mounted on shell 50 at a plurality of points are studs 55. The metallic mesh 54 is rigidly mounted on the aforesaid plurality of studs 55. Mounted in the mesh-like material 54 is a refractory material such as a refractory cement 56.

The insulating material is thickened in the region of the bottom of the reactor shell to provide a substantially horizontal shelf 57. Shelf 57 is provided with a plurality of grooves 58 extending radially from the vapor outlet. In the region of the top of the reactor the reactor is provided with a liner guide ring, 59 which is mounted upon a plurality of studs 60 attached to the top of the reactor. The liner guide ring 59 extends downwardly below the vapor distributor in the reactor.

Mounted on the horizontal shelf is an annular metallic plate 61. Rigidly mounted on the aforesaid annular plate 61 in the region of the periphery of the annular plate 61 is a cylindrical liner 62. The cylindrical liner 62 extends upwardly to the aforesaid liner guide ring 59. The outer diameter of the liner guide ring is somewhat less than the inside diameter of the cylindrical liner to provide a catalyst-tight sliding joint with the liner. The internal diameter of this liner guide ring 59 is a multiple of the diameter of the vapor inlet 51. The vapor outlet is provided with a purge gas inlet 63 and a purge gas conduit 64 in fluid communication with the grooves 58 in the surface of horizontal shelf 57 and the space between the liner and the insulating layer.

The reactor is purged in a manner similar to that described in conjunction with the description of the spherical reactor.

The presently described bottom-supported liner provides several advantages over the prior art means of lining reactors. Thus, with the present bottom-supported liner gases and vapors cannot to any substantial extent by-pass the catalyst bed whereas, for example, when the liner is supported from the top of the reactor substantial portions of the gases can by-pass the catalyst bed in the event of a liner or liner hanger failure. Furthermore, the expansion guide at the bottom of the top-supported liner may bind and cause damage to the lining and hot spots on the shell. The sliding joint at the bottom of the top-supported liner can also open to permit catalyst to leak into the reactor outlet vapor stream.

The present invention also provides increased flexibility in that an expansion joint is provided in the lining of the outlet nozzle.

We claim:
1. In a reactor for hydrocarbon conversions comprising a reactor shell, an upper vapor inlet and a lower vapor outlet, said shell being lined with an insulating layer of insulating material, the improvement which comprises a thickened insulating layer at the bottom of said reactor shell to provide a substantially horizontal shelf surrounding said vapor outlet, an annular metal plate mounted on and supported by said shelf, said annular plate having a diameter less than that of said shelf, a metal liner rigidly mounted on said annular plate in the region of the periphery thereof and extending upwardly to a region adjacent said upper vapor inlet and spaced from said insulating layer to provide a gas passage between said liner and said insulating layer, a metal ring mounted on the inner side of said shell in the region of and substantially concentric with said vapor inlet, said ring having an inside diameter which is substantially larger than the outside diameter of said vapor inlet and having an outside diameter sufficiently less than the inside diameter of the upper opening of said liner to provide a catalyst-tight slid- ing joint between said ring and said liner, a purge gas inlet in said vapor outlet, a purge gas conduit in said vapor outlet, and a plurality of purge gas conduits in the upper surface of said horizontal shelf providing fluid communication between said purge gas conduit in said vapor outlet and said gas passage between said liner and said insulating layer.

2. In a reactor for hydrocarbon conversions as set forth and described in claim 1 wherein a vapor-solids separator is mounted on said annular metallic plate.

3. In a reactor for hydrocarbon conversions as set forth and described in claim 1 wherein a vapor-solids separator is mounted on said annular metallic plate, and said vapor-solids separator comprises a foraminous cylinder having an inside diameter larger than the outside diameter of the vapor outlet, and a foraminous plate having a diameter substantially the same as that of said foraminous cylinder mounted on the upper end of said cylinder.

4. In a reactor for hydrocarbon conversions comprising a reactor shell, an upper vapor inlet, and lower vapor outlet, said shell being lined with an insulating layer of insulating material, said vapor inlet and said vapor outlet each being lined with an insulating layer of insulating material, the improvement which comprises a thickened insulating layer at the bottom of said reactor shell to provide a substantially horizontal shelf surrounding said vapor outlet, a plurality of grooves in the upper surface of said shelf, an annular metal plate having a diameter less than that of said shelf, a metal liner rigidly mounted on and supported by said annular plate in the region of the periphery thereof extending upwardly to a liner joint ring and spaced from said insulating layer to provide a gas passage between said liner and said insulating layer, a metal liner joint ring mounted on the inner side of said shell in the region of and substantially concentric with said vapor inlet, said ring having an inside diameter which is substantially larger than the outside diameter of said vapor inlet and having an outside diameter sufficiently less than the inside diameter of the upper opening of said liner to provide a catalyst-tight sliding joint with said liner, a purge gas inlet in said vapor outlet, a conduit in the insulating liner layer in said vapor outlet constructed and arranged to provide fluid communication between said purge gas inlet and said grooves in the upper surface of said horizontal shelf and the gas passage between the liner and the insulating layer.

5. The invention as set forth and described in claim 4 wherein the reactor is a spherical reactor.

6. The invention as set forth and described in claim 4 wherein the reactor is a cylindrical reactor.

References Cited in the file of this patent

FOREIGN PATENTS 473,667    Canada _____ May 1, 1951